No. 771,927. PATENTED OCT. 11, 1904.
F. H. PARADICE.
GREASE TRAP.
APPLICATION FILED MAY 11, 1903.
NO MODEL.
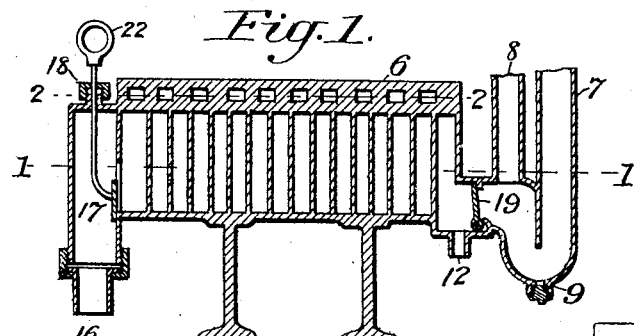
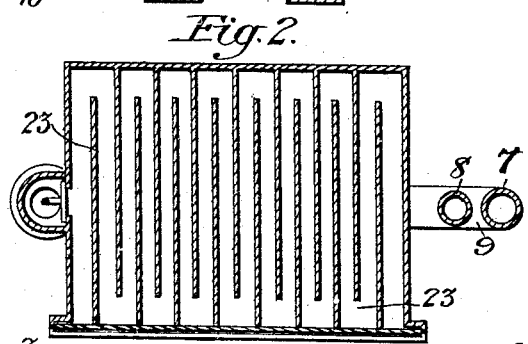
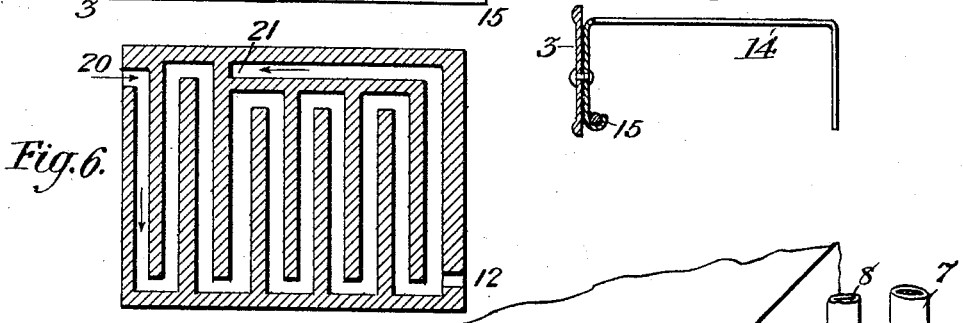
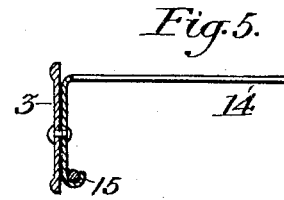
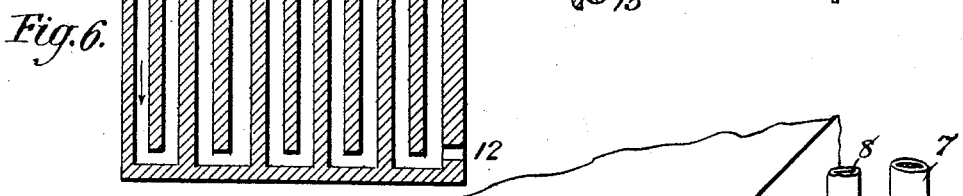
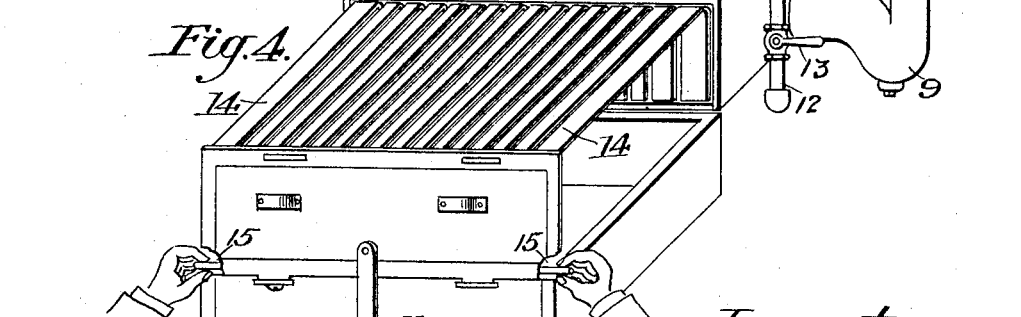
Witnesses:
Inventor:
Frank H. Paradice No. 771,927.

Patented October 11, 1904.

UNITED STATES PATENT OFFICE.

FRANK H. PARADICE, OF DENVER, COLORADO.

GREASE-TRAP.

SPECIFICATION forming part of Letters Patent No. 771,927, dated October 11, 1904.

Application filed May 11, 1903. Serial No. 156,724. (No model.)

*To all whom it may concern:*

Be it known that I, FRANK H. PARADICE, a citizen of the United States, residing at Denver, in the county of Denver and State of Colorado, have invented a new and useful Grease-Trap, of which the following is a specification.

My invention relates to improvements in grease-traps which are installed in dwellings, hotels, and other buildings for the purpose of intercepting grease that is carried in the waste water from sinks and other apparatus.

Some grease-traps as heretofore made have water-jackets surrounding the chamber where the grease is collected, and others have a water-pipe passing through them for the purpose of chilling the waste water, and thus causing the grease to rise to top of trap. Others depend entirely on the waste water retained in trap to chill the incoming waste water sufficiently to cause the grease to rise to surface of the water. This last-described trap is not effective. The first-described intercepts a larger proportion of grease, but does not stop all the grease in the waste water, and both are objectionable, for the reason that they retain a large quantity of waste water and sediment that becomes foul, and this offensive matter causes a stench in the house when the trap is opened to remove the grease. This operation takes quite a long time. To be at all effective, the water-jacket trap must be made large, too large to set under the kitchen-sink, and have sufficient room to remove its contents.

My invention is an improvement over the grease-traps as heretofore made in the following particulars: It causes the waste water to flow very much slower through the trap. A smaller quantity of sediment and waste water is retained in the trap, and this is all ejected from trap into the sewer before it is opened to remove the grease. The cooling-chamber is much more effective, as the water circulates over the top of trap, where the cool surface should be. A serviceable grease-trap with my improvement can be made much smaller than as before made, enabling it to be placed underneath the sink. As it opens at the front in place of on top, it is accessible. As the cover or door is partly below water-lines it is not liable to be imperfectly fastened, (as the trap with cover on top is,) for the reason that if improperly fastened a water leak would occur, while a leak in the top cover would not be visibly indicated. The grease can be removed much quicker and with less labor from my improved grease-trap.

Now having described traps as heretofore made and stated, wherein my trap is an improvement over them, I will by the following specification and the accompanying drawings explain improvements in my grease-trap.

Having reference to the drawings, Figure 1 is a vertical section of the grease-trap. Fig. 2 is a plan on the line 1 1. Fig. 3 is a view of the cover of the side opening for removal of grease. Fig. 4 is a perspective view of part of the trap, showing the trap open with the cleaners or scrapers drawn out and a box on floor ready to catch the grease as it falls from the scrapers when the rod or strap of iron is passed around them, as is indicated by the hands holding the ends of the rod. Fig. 5 is an end view of cover and one scraper. It also shows the end of rod resting in hook, said rod being a continuation of the scraper. Fig. 6 is a plan view of the trap at 2 2 in section, Fig. 1, showing the channels for the cold water to circulate through.

Similar figures refer to similar parts throughout the several views.

7 is inlet of stench-trap leading from sink.

8 is vent-pipe.

9 is the part of stench-trap that contains the water to prevent gases passing through the sink connection into room.

10 10 10 10 are fastenings to clamp cover, Fig. 3, to trap.

11 is a swinging leg to support cover and scraper when same are drawn out to remove grease.

12 is the pipe through which water passes when trap is being flushed preceding the removal of the grease. 13 is the stop-cock controlling same.

14 at Fig. 5 represents one of the scrapers. 14 14 at Fig. 4 represents all the scrapers.

15 is the rod for removing the grease from the scrapers.

16 is the outlet from the grease-trap.

17 is the valve or gate which is opened when flushing the trap.

18 is stuffing-box.

19 is a flap-valve which is closed by the water from pipe 12 when trap is being flushed.

20 is the inlet of the cooling-pipe. 21 is the outlet of same.

22 is the handle of gate.

In order to install my grease-trap, the sink-waste is connected to trap-pipe 7 and vent 8 is connected to vent-pipe. The trap now being empty and the cover, Fig. 3, being closed and the scrapers in the channels 23 23, each channel containing a scraper, the ends of same coming close up to the ends of channels, the flap 19 being in its normal position—that is, horizontal—lying over the pipe 12, the gate 17 is closed, as in Fig. 1. The cold-water pipe is connected to 20, and the outlet 21 is connected to boiler or run to sink or connected to any pipe through which all or the greater part of the cold water passes, the stop-valve 13 being closed. After the first waste water passes through grease-trap the stench-trap is filled to a point on a level with the dotted lines across Fig. 1, and the grease-trap is filled to dotted lines, Fig. 1. As the water has passed (in an ordinary-sized trap) about twenty feet, it will have become cooled, even if when entering trap it had been quite hot. The grease would be chilled and stuck to sides of channels or floating on water which remains in grease-trap. The waste water flowing through thereafter will cause the grease to rise up and cling to the sides of channels and to the scrapers in the channels. When a stoppage of waste from sink indicates that the grease should be removed, the gate 17 is raised by handle 22, and the stop-cock 13 is opened, the water closing 19, which prevents water from backing up into sink or vent, putting the force of the water on the sediment and partially washing the grease. The stop-valve 13 is then turned off and gate 17 put down, and the cover, Fig. 3, is unfastened and drawn back to the position shown at Fig. 4, thus pulling out the scrapers 14, and as these are made the full width of the channels all the grease is scraped out of trap, some of it falling into a box or other suitable receptacle, and the part clinging to the scrapers is quickly removed by passing rod from where shown at Fig. 4 up to top of cover 3, thence across scrapers 14, thence down to bottom of scrapers. The rod is then to be returned to the hooks provided to receive it, it being shut into trap and always available for the purpose.

Having described my invention and its use, what I claim as new, and for which I desire that Letters Patent be granted me, is—

A grease-trap having a sinuous passage for waste water, and a sinuous passage for cooling-water, a stench-trap with valve at inlet, a gate at outlet, a flushing-pipe with stop-valve, a vertical cover, or door, with attached scrapers and scraping-rod, substantially as shown.

In testimony whereof I affix my signature in presence of two witnesses.

FRANK H. PARADICE.

Witnesses:
 FRANK M. HAVENS,
 G. A. BOSLER.